Patented Mar. 17, 1936

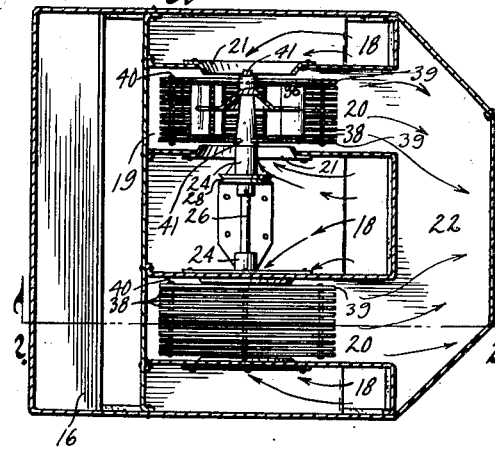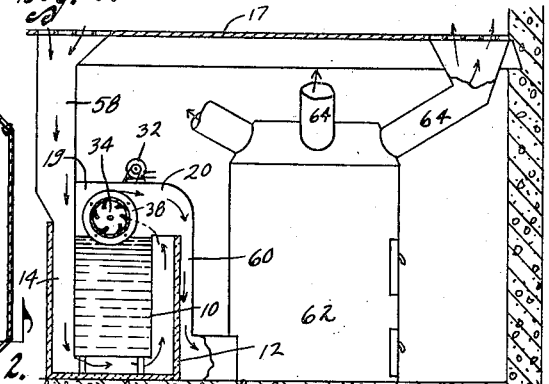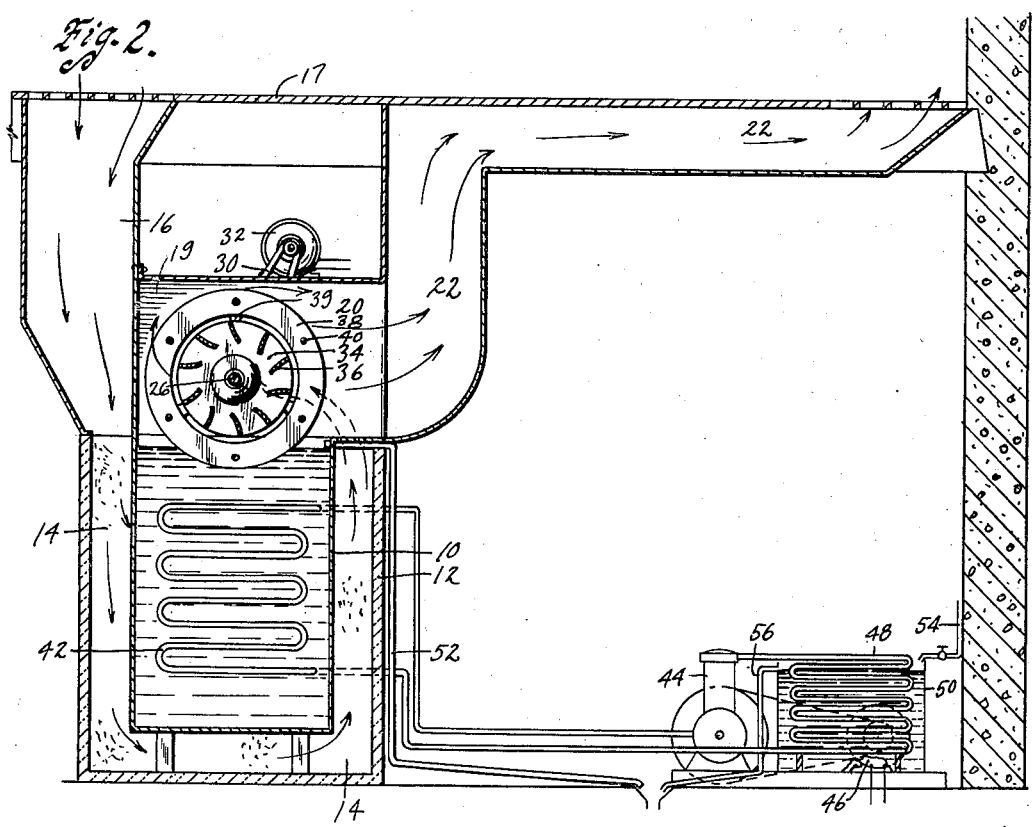

2,034,310

UNITED STATES PATENT OFFICE 2,034,310

AIR CONDITIONING UNIT

Lawrence M. Persons, Des Moines, Iowa, assignor to Penn Electric Switch Co., Des Moines, Iowa, a corporation of Iowa Application April 2, 1934, Serial No. 718,537

3 Claims. (Cl. 261—92)

One object of my present invention is to provide an air conditioning unit of improved character over the air conditioning unit shown in my co-pending application, Serial No. 651,521, filed January 13, 1933, the improved unit, however, being comparatively simple and inexpensive from a manufacturing standpoint.

More particularly it is my object to provide an improvement for air conditioning units of that type having either cooling and dehumidifying water or water for humidifying purposes contained in a tank with an element movable into and out of the water over which air is caused to flow, the improvement being in the form of passageways causing the flowing air to come in contact with the outer surface of the receptacle before it reaches the humidifying or dehumidifying element, thus causing heat transfer between the air and the water within the tank to increase the efficiency of the unit.

Still a further object is to provide an air conditioning unit having a water receptacle and a wall, preferably of insulating material spaced therefrom, air circulating mechanism being provided which causes circulation of the air between the insulating wall and the receptacle so that heat transfer can occur before the air comes in contact with the humidifying or dehumidifying elements.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a sectional plan view of an air conditioning unit of the improved type embodying my invention.

Figure 2 is a vertical sectional view on the line 2—2 of Figure 1 showing the unit in use for dehumidifying and cooling purposes.

Figure 3 is a diagrammatic view showing the unit in use as a humidifying unit in connection with a furnace.

On the accompanying drawing I have used the reference numeral 10 to indicate a receptacle. The receptacle 10 is preferably formed of sheet metal or other material through which heat can be transferred readily. Spaced from the walls of the receptacle 10 is a container or wall 12 preferably formed of insulating material so that escape or entrance of heat to the space 14 between the wall 12 and the receptacle 10 is minimized.

In Figure 2, I have shown a warm air duct 16 dropping from a floor 17 and communicating with the space 14 in the air conditioning unit. The spaces 14 communicate with passageways 18 which, as best shown by arrows in Figure 1, communicate with the interior of blower housings 19 through cone shaped entrance openings 21. The blower housings have discharge passageways 20 communicating with a cool air duct 22 leading to the room above the floor 17.

Journalled in bearings 24 is a blower shaft 26. It has a pulley 28 thereon which is rotated through the medium of a belt 30 from a motor 32. The motor 32 can be controlled manually or automatically in any desired manner, as disclosed in my co-pending application hereinbefore referred to. Blowers are provided on the ends of the shaft 26 and comprise discs 34 having blades 36.

Surrounding the blades 36 are a plurality of ring shaped discs 38 substantially supported by spiders 39 and bearings 41 for rotation on the shaft 26 by reason of friction between the two as shown in my co-pending application. The discs 38 are assembled on rods 40 and are spaced along the rods so that air can pass from the blower blades 36 outwardly between the discs 38.

In Figure 2, I have shown a cooling coil 42 for extracting heat from the water in the receptacle 10 and a refrigerant compressor 44 driven by an electric motor 46 for circulating refrigerant through the coil 42.

The motor can be controlled in any desired manner. A condenser coil is illustrated at 48 and is cooled by water in a receptacle 50. A water supply pipe 54 and an overflow drain 56 are used with the receptacle 50 in the ordinary manner for water cooled condenser types of mechanical refrigerators.

In Figure 3, I have illustrated the air conditioning unit in combination with a furnace 62. A cold air duct 58 drops from the floor 17 into the unit and another one, 60, drops from the unit to the jacket of the furnace. The hot air pipes are indicated at 64. The unit in this figure is used as a humidifier rather than a cooler and dehumidifier, as in Figure 2.

*Practical operation*

In the operation of my improved unit as a dehumidifier and room air cooler, the relatively warm air entering the duct 16 flows through the passageways 14 and in so doing comes in contact with the cool tank 10, thus somewhat reducing the temperature of the air before it comes in contact with the cool discs 38. This reduction in temperature tends to condense the moisture in the air and when the air strikes the discs 38 the moisture more readily becomes condensed than if the air came directly from the passageway 16 to the discs. The moisture condenses on the surfaces of the elements 38 and is removed therefrom by coming in contact with the water in the receptacle 10. The water keeps the discs 38 at a low temperature and consequently additionally cools the air as it comes from the passageways 14 and strikes the discs 38 before leading to the room through the passageways 22.

Without the passageways 14, there is a tendency for the incoming air from the duct 16 to lower the temperature of the water in the receptacle 10 to the wet bulb temperature. With the air first coming in contact with the receptacle 10 this tendency is counteracted, the water in absorbing heat from the air through the walls of the receptacle rising more nearly to the dry bulb temperature. The work of cooling the air performed by the discs 38 is thus decreased as the air coming in contact with the tank 10 accomplishes part of the cooling.

I am thus able to increase the efficiency of the unit over the type of unit shown in my co-pending application. The walls 12 being of insulation minimizes absorption of heat from the atmosphere surrounding the insulated wall, thus bringing the efficiency to a maximum.

When the unit is used for humidification, as in Figure 3, the cool air first coming in contact with the receptacle 10 tends to absorb heat therefrom, thus lowering the water to the wet bulb temperature instead of its temperature tending to rise to the dry bulb temperature as when the passageways 14 are not provided. Humidification is then accomplished in a more facile manner and the efficiency of the unit as a humidifier is thus increased.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In an air conditioning unit, a tank for water, an element having a portion movable into and out of the water in said tank, said tank being formed of heat conducting material, means for supporting said tank with the bottom and all sides thereof exposed to circulated air, walls spaced from said bottom and sides and providing a space therebetween for circulated air, and means for circulating the air, first through said space, and then past the portion of said element out of the water.

2. In an air conditioning unit, air circulating mechanism, a tank for water, and formed of heat conducting material, an element having a portion movable into and out of the water in said tank, means for supporting said tank with the bottom and all sides thereof exposed to circulated air, walls spaced from said bottom and sides and providing a space therebetween for the circulated air, and means for causing the air circulated by said air circulating mechanism to flow first through said space and then past the portion of said element out of the water.

3. In an air conditioning unit, a tank for water, an element having a portion movable into and out of the water in said tank, said tank being formed of heat conducting material, means for supporting said tank with the bottom and opposite sides thereof exposed to circulated air, walls spaced from said bottom and sides and providing a space therebetween for circulated air and means for circulating the air through said space first down one side, second across said bottom, third up the other side of said tank and then past the portion of said element out of the water.

LAWRENCE M. PERSONS.